(12) United States Patent
Goto et al.

(10) Patent No.: US 7,547,743 B2
(45) Date of Patent: Jun. 16, 2009

(54) HEAT CONDUCTIVE SILICONE RUBBER COMPOSITION AND MOLDED ARTICLE

(75) Inventors: Tomoyuki Goto, Gunma-ken (JP); Kei Miyoshi, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 202 days.

(21) Appl. No.: 11/127,282

(22) Filed: May 12, 2005

(65) Prior Publication Data

US 2005/0256259 A1    Nov. 17, 2005

(30) Foreign Application Priority Data

May 13, 2004  (JP)  ............................. 2004-143977

(51) Int. Cl.
  *C08K 3/14*  (2006.01)
  *C08K 3/22*  (2006.01)

(52) U.S. Cl. ........................ 524/588; 524/404; 524/424; 524/428; 524/430; 524/433; 524/432; 524/437; 524/441; 524/440; 524/442; 528/15; 528/35

(58) Field of Classification Search ................ 524/588, 524/404, 424, 428, 430, 433, 432, 437, 441, 524/440, 442; 528/35, 15
See application file for complete search history.

(56) References Cited

U.S. PATENT DOCUMENTS

| | | | |
|---|---|---|---|
| 4,292,223 A | 9/1981 | Theodore et al. | |
| 4,292,224 A | 9/1981 | Theodore | |
| 4,292,225 A | 9/1981 | Theodore et al. | |
| 4,293,477 A | 10/1981 | Theodore | |
| 5,352,731 A | 10/1994 | Nakano et al. | |
| 6,306,957 B1 | 10/2001 | Nakano et al. | |
| 6,844,393 B2 * | 1/2005 | Goto et al. | .................. 524/588 |
| 7,329,706 B2 | 2/2008 | Fukui et al. | |
| 2004/0254275 A1 * | 12/2004 | Fukui et al. | .................. 524/261 |
| 2006/0100336 A1 | 5/2006 | Fukui | |

FOREIGN PATENT DOCUMENTS

| | | |
|---|---|---|
| JP | 47-32400 A | 11/1972 |
| JP | 56-100849 A | 8/1981 |
| JP | 64-69661 A | 3/1989 |
| JP | 4-328163 A | 11/1992 |
| JP | 2000-256558 A | 9/2000 |
| JP | 2005-325212 A | 11/2005 |
| WO | WO-02/092693 A1 | 11/2002 |

OTHER PUBLICATIONS

English language abstract WO 02/092693, Nov. 21, 2002.*

* cited by examiner

*Primary Examiner*—Margaret G Moore
(74) *Attorney, Agent, or Firm*—Birch, Stewart, Kolasch & Birch, LLP

(57) ABSTRACT

A heat conductive silicone rubber composition comprising (A) an organopolysiloxane containing, on the average, at least 0.1 silicon-bonded alkenyl radical and having a viscosity of 50-100,000 mPa·s at 25° C., (B) an organopolysiloxane containing, on the average, at least 2 SiH radicals and having a viscosity of 1-100,000 mPa·s at 25° C., (C) a heat conductive filler, (D) a platinum catalyst, and (E) a specific organopolysiloxane having a molecular weight of at least 10,000, is easy to handle and mold, and especially smooth in flow, even when heavily loaded with the filler.

10 Claims, 1 Drawing Sheet

HEAT CONDUCTIVE SILICONE RUBBER COMPOSITION AND MOLDED ARTICLE

CROSS-REFERENCE TO RELATED APPLICATION

This non-provisional application claims priority under 35 U.S.C. §119(a) on Patent Application No. 2004-143977 filed in Japan on May 13, 2004, the entire contents of which are hereby incorporated by reference.

TECHNICAL FIELD

This invention relates to a heat conductive silicone rubber composition which is easy to handle and mold and especially smooth in flow, despite heavy loadings of heat conductive filler, and a molded article thereof.

BACKGROUND ART

Heat-generating parts such as power transistors and thyristors deteriorate their performance due to the heat generated. It is a common practice in the prior art that such heat-generating parts are provided with heat sinks for heat dissipation or suitable means for conducting heat to a metal chassis of the associated equipment for heat release. To improve both electrical insulation and heat transfer, heat-dissipating, electrically insulating sheets of silicone rubber loaded with heat conductive fillers often intervene between heat-generating parts and heat sinks.

As the heat-dissipating, electrically insulating material, JP-A 47-32400 discloses an electrically insulating composition comprising 100 parts by weight of synthetic rubber, typically silicone rubber and 100 to 800 parts by weight of at least one metal oxide selected from beryllium oxide, aluminum oxide, hydrated aluminum oxide, magnesium oxide, and zinc oxide.

As the heat-dissipating material for use in areas where electrical insulation is not required, JP-A 56-100849 corresponding to U.S. Pat. Nos. 4,292,223, 4,292,224, 4,292,225, and U.S. Pat. No. 4,293,477 discloses a composition comprising 100 parts by weight of an addition curing type silicone rubber and 60 to 500 parts by weight of silica and a heat conductive powder such as silver, gold or silicon.

These heat conductive materials, however, have a thermal conductivity of less than 1.5 W/mK. If silicone rubber compositions are loaded with large amounts of heat conductive fillers in order to improve the heat transfer thereof, the compositions lose fluidity and become very difficult to mold and work.

One solution to this problem is found in JP-A 1-69661 which discloses a good heat conductive rubber/plastic composition loaded with alumina consisting of 10 to 30% by weight of alumina particles having an average particle size of up to 5 μm and the balance of spherical corundum of single particles having an average particle size of at least 10 μm and of cutting edge-free shape. Also, JP-A 4-328163 corresponding to U.S. Pat. No. 5,352,731 discloses a heat conductive silicone rubber composition comprising 100 parts by weight of a base of an organopolysiloxane gum having an average degree of polymerization of 6,000 to 12,000 combined with an organopolysiloxane oil having an average degree of polymerization of 200 to 2,000 and 500 to 1,200 parts by weight of spherical aluminum oxide powder.

However, in the case of heavy loading of more than 1,000 parts by weight of aluminum oxide powder per 100 parts by weight of the base polymer or more than 70% by volume of aluminum oxide, for example, these methods relying merely on a combination of coarse and fine particles or a viscosity adjustment of the silicone base encounter a certain limit in improving the moldability and workability of silicone rubber compositions.

It would be desirable to improve the moldability and workability of silicone rubber compositions. JP-A 2000-256558 corresponding to U.S. Pat. No. 6,306,957 discloses a heat conductive silicone rubber composition comprising 0.1 to 50% by volume of a hydrolyzable radical-containing methylpolysiloxane as a wetter. The use of the wetter is successful in improving the moldability and workability of heat conductive silicone rubber compositions. However, as the proportion of the wetter added is increased for achieving higher heat conduction, the composition is minimized in viscosity buildup, but loses its fluidity.

SUMMARY OF THE INVENTION

Therefore, an object of the invention is to provide a heat conductive silicone rubber composition which is easy to handle and mold and especially smooth in flow, despite heavy loadings of heat conductive filler, and a molded article thereof.

The inventor has discovered that a heat conductive silicone rubber composition comprising (A) an organopolysiloxane containing, on the average, at least 0.1 silicon-bonded alkenyl radical in a molecule and having a viscosity of 50 to 100,000 mPa·s at 25° C., (B) an organopolysiloxane containing, on the average, at least 2 silicon-bonded hydrogen atoms in a molecule and having a viscosity of 1 to 100,000 mPa·s at 25° C., (C) a heat conductive filler, (D) a platinum catalyst, and (E) a specific organopolysiloxane having a molecular weight of at least 10,000, is easy to handle and mold, and especially smooth in flow, even when heavily loaded with the heat conductive filler.

Accordingly, the present invention provides a heat conductive silicone rubber composition comprising (A) 2 to 99 parts by weight of an organopolysiloxane containing, on the average, at least 0.1 silicon-bonded alkenyl radical in a molecule and having a viscosity of 50 to 100,000 mPa·s at 25° C., (B) an organopolysiloxane containing, on the average, at least 2 silicon-bonded hydrogen atoms in a molecule and having a viscosity of 1 to 100,000 mPa·s at 25° C., in an amount to give 0.1 to 6.0 moles of silicon-bonded hydrogen atoms per mole of total silicon-bonded alkenyl radicals in entire components, (C) a heat conductive filler in an amount of 100 to 3,500 parts by weight per 100 parts by weight of components (A) and (E) combined, (D) an effective amount of a platinum catalyst, and (E) 98 to 1 part by weight of an organopolysiloxane represented by the general formula (I) and having a molecular weight of at least 10,000, the amount of components (A) and (E) combined being 100 parts by weight.

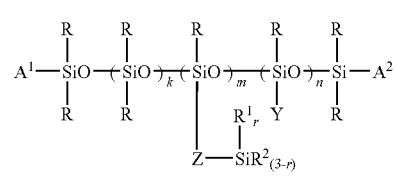

-continued

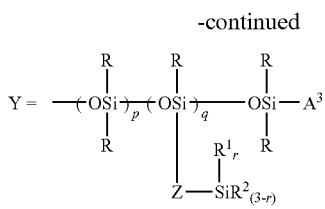

Herein R is each independently a substituted or unsubstituted, monovalent hydrocarbon radical, $R^1$ is a monovalent hydrocarbon radical of 1 to 4 carbon atoms, $R^2$ is an alkoxy, alkenyloxy or acyloxy radical of 1 to 4 carbon atoms, Z is an oxygen atom or a divalent hydrocarbon radical of 2 to 10 carbon atoms, r is 0, 1 or 2, k is an integer of 100 to 1,000, m is an integer of 0 to 20, n is an integer of 0 to 20, p is an integer of 50 to 1,000, q is an integer of 0 to 20, the sum of k+m+n is from 100 to 1,000, each of $A^1$, $A^2$ and $A^3$ is R or —Z—Si$(R^1_r)R^2_{(3-r)}$ wherein $R^1$, $R^2$, r and Z are as defined above, at least one —Z—Si$(R^1_r)R^2_{(3-r)}$ radical being included per molecule.

The heat conductive silicone rubber composition of the invention is easy to handle and mold and especially smooth in flow, even when it is heavily loaded with the heat conductive filler for achieving a higher heat conductivity.

BRIEF DESCRIPTION OF THE DRAWING

The only FIGURE, FIG. 1 schematically illustrates an assembly for the shear bond strength test.

DESCRIPTION OF THE PREFERRED EMBODIMENTS

Figure 1:
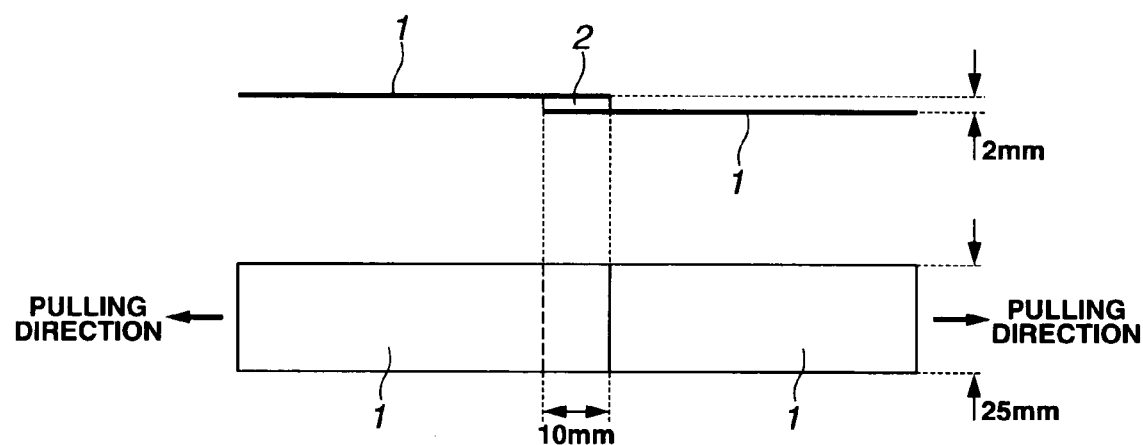

Briefly stated, the heat conductive silicone rubber composition of the invention comprises (A) an alkenyl-containing organopolysiloxane, (B) an organohydrogenpolysiloxane, (C) a heat conductive filler, (D) a platinum catalyst, (E) an organopolysiloxane of formula (I), and optionally (F) a diorganopolysiloxane of formula (III). The respective components are described in sequence.

Component (A) is an organopolysiloxane serving as a base polymer of the composition. It should contain, on the average, at least 0.1 silicon-bonded alkenyl radical, preferably at least 0.8 silicon-bonded alkenyl radical, and more preferably at least 2 silicon-bonded alkenyl radicals in a molecule. The number of alkenyl radicals per molecule is generally up to about 20, and especially up to about 10. If the average number of silicon-bonded alkenyl radicals per molecule is below the lower limit of the above-defined range, the resulting composition may become under-cured. If the average number exceeds the upper limit of the range, the cured product or silicone rubber may have degraded rubber properties.

The content of alkenyl radicals should preferably be 0.01 to 20 mol %, more preferably 0.1 to 10 mol % of the entire organic radicals bonded to silicon atoms in a molecule. The alkenyl radicals may be bonded to the silicon atoms at the ends of the molecular chain or silicon atoms midway the molecular chain or both. For the curing rate of the composition and the physical properties of the cured product, the organopolysiloxane should preferably contain at least an alkenyl radical bonded to a silicon atom at one end of the molecular chain, especially alkenyl radicals bonded to the silicon atoms at both ends of the molecular chain.

In component (A), suitable silicon-bonded alkenyl radicals include those of 2 to about 8 carbon atoms, especially 2 to about 6 carbon atoms, such as vinyl, allyl, butenyl, pentenyl and hexenyl, with the vinyl being most preferred. In addition to the alkenyl radicals, the organopolysiloxane (A) contains silicon-bonded organic radicals, which are unsubstituted or halo-substituted monovalent hydrocarbon radicals attached to silicon atoms, other than alkenyl radicals. Examples of such additional organic radicals include those of 1 to about 12 carbon atoms, preferably 1 to about 8 carbon atoms, typically alkyl radicals such as methyl, ethyl, propyl, isopropyl, butyl, isobutyl, tert-butyl, hexyl; cycloalkyl radicals such as cyclopentyl and cyclohexyl; aryl radicals such as phenyl, tolyl and xylyl; aralkyl radicals such as benzyl; and halo-substituted hydrocarbon radicals in which some hydrogen atoms on the foregoing are replaced by chlorine or fluorine atoms or the like. Of these, alkyl and aryl radicals are preferred, with methyl and phenyl being most preferred.

The organopolysiloxane (A) should have a viscosity of 50 to 100,000 mPa·s at 25° C., preferably 100 to 50,000 mPa·s at 25° C. If the viscosity is below the lower limit of the range, the resulting silicone rubber is substantially degraded in physical properties including rubber strength such as rubber hardness, tensile strength, tear strength and rubber physical properties such as elongation. If the viscosity exceeds the upper limit of the range, the resulting silicone rubber composition becomes very difficult to handle and work. The molecular structure of the organopolysiloxane (A) is not particularly limited and it may have a linear, cyclic or branched structure, a partially branched linear structure, or a three-dimensional network structure. The preferred organopolysiloxane basically has a linear structure whose backbone consists of recurring diorganosiloxane units and is capped at both ends with triorganosiloxy radicals. Component (A) may be a homopolymer having such a molecular structure, a copolymer of such molecular structures, or a mixture thereof.

The organopolysiloxane (A) may be obtained by well-known methods. One general method is by effecting equilibration reaction between organocyclopolysiloxane and hexaorganodisiloxane in the presence of an alkali or acid catalyst. Examples of the organopolysiloxane (A) are shown below by the general formulae.

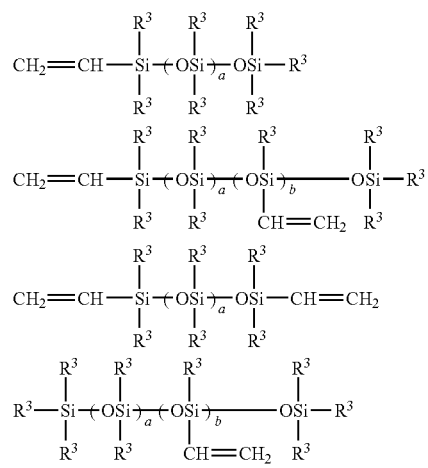

-continued

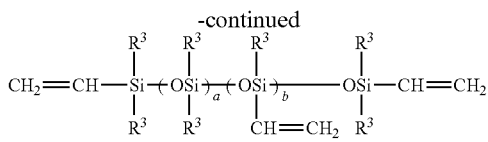

Herein, $R^3$ is a halo-substituted or unsubstituted, monovalent hydrocarbon radical of 1 to 12 carbon atoms, especially 1 to 8 carbon atoms, examples of which are as set forth above for the silicon-bonded substituted or unsubstituted, monovalent hydrocarbon radicals exclusive of the alkenyl radicals, with methyl and phenyl being most preferred. The subscript a and b are integers of $a \geq 1$ and $b \geq 0$, preferably a is an integer of 1 to 20, and b is an integer of 10 to 1,000. The sum of a+b is such that the organopolysiloxane may have a viscosity in the above-defined range.

The amount of component (A) compounded is 2 to 99 parts by weight, preferably 30 to 95 parts by weight, and more preferably 50 to 95 parts by weight, per 100 parts by weight of components (A), (E) and (F) combined. If the amount of component (A) is too less, the cured product or silicone rubber has a lower mechanical strength. If the amount of component (A) is too large, the proportion of component (E) relative to component (C) is accordingly too low, failing to improve flow.

Component (B) is an organopolysiloxane serving as a crosslinking agent in the composition. It is an organohydrogenpolysiloxane containing, on the average, at least two silicon-bonded hydrogen atoms (i.e., SiH radicals) in a molecule.

The molecular structure of component (B) is not particularly limited as long as it reacts with component (A) to serve as a crosslinking agent. Use may be made of any of linear, cyclic, branched or three-dimensional network structures which are commonly manufactured in the art. The only requirement is that the average number of silicon-bonded hydrogen atoms (SiH radicals) per molecule be at least 2, with the average number of SiH radicals being preferably 2 to about 200, and more preferably 3 to about 100. Such organohydrogenpolysiloxanes are typically represented by the average compositional formula (1).

$$R^4_c H_d SiO_{(4-c-d)/2} \quad (1)$$

Herein $R^4$ is a substituted or unsubstituted, monovalent hydrocarbon radical free of aliphatic unsaturation, preferably having 1 to 10 carbon atoms, examples of which are as set forth above for the silicon-bonded substituted or unsubstituted, monovalent hydrocarbon radicals exclusive of the alkenyl radicals in component (A). $R^4$ is preferably an alkyl or aryl radical, and most preferably methyl or phenyl. The subscript c is a positive number of 0.7 to 2.1, and d is a positive number of 0.001 to 1.0, and c+d is 0.8 to 3.0; and preferably c is 1.0 to 2.0, and d is 0.01 to 1.0, and c+d is 1.5 to 2.5.

At least two, preferably at least three SiH radicals in the molecule may be positioned at ends or midway of the molecular chain or both. Preferred are those organohydrogenpolysiloxanes in which the number of silicon atoms per molecule (or the degree of polymerization) is 2 to about 300, especially about 4 to about 150. Typically used are those which have a viscosity of 1 to 100,000 mPa·s at 25° C., more preferably 1 to 5,000 mPa·s at 25° C. and are liquid at room temperature (25° C.).

Illustrative examples of the organohydrogenpolysiloxane having formula (1) include 1,1,3,3-tetramethyldisiloxane, methylhydrogencyclopolysiloxane, methylhydrogensiloxane-dimethylsiloxane cyclic copolymers, both end trimethylsiloxy-blocked methylhydrogenpolysiloxane, both end trimethylsiloxy-blocked dimethylsiloxane-methylhydrogensiloxane copolymers, both end dimethylhydrogensiloxy-blocked dimethylpolysiloxane, both end dimethylhydrogensiloxy-blocked dimethylsiloxane-methylhydrogensiloxane copolymers, both end trimethylsiloxy-blocked methylhydrogensiloxane-diphenylsiloxane copolymers, both end trimethylsiloxy-blocked methylhydrogensiloxane-diphenylsiloxane-dimethylsiloxane copolymers, both end dimethylhydrogensiloxy-blocked methylhydrogensiloxane-dimethylsiloxane-diphenylsiloxane copolymers, copolymers of $(CH_3)_2HSiO_{1/2}$ units, $(CH_3)_3SiO_{1/2}$ units and $(C_6H_5)_3SiO_{1/2}$ units, and copolymers of $(CH_3)_2HSiO_{1/2}$ units, $HSiO_{3/2}$ units and $(C_6H_5)_3SiO_{1/2}$ units.

The organohydrogenpolysiloxane (B) may be obtained by well-known preparation methods. In one general preparation method, it may be readily obtained by effecting equilibration between octamethylcyclotetrasiloxane and/or tetramethylcyclodisiloxane and a compound containing a hexamethyldisiloxane or 1,1'-dihydro-2,2',3,3'-tetramethyl-disiloxane unit serving as a terminal radical, in the presence of a catalyst such as sulfuric acid, trifluoromethanesulfonic acid or methanesulfonic acid at a temperature between about −10° C. and about +40° C.

Component (B) is compounded in such amounts as to provide 0.1 to 6.0 moles, especially 0.2 to 3.0 moles of silicon-bonded hydrogen atoms per mole of total silicon-bonded alkenyl radicals in the entire components, that is, components (A), (E) and (F). If the amount of component (B) is below the lower limit of the above-defined range, the resulting silicone rubber composition becomes under-cured. If the amount of component (B) exceeds the upper limit of the above-defined range, the resulting silicone rubber becomes too hard and has many cracks on its surface.

Component (C) is a heat conductive filler which is typically an inorganic powder and/or a metal powder having heat conductivity. Typically, the inorganic powder is selected from among aluminum oxide, zinc oxide, silicon oxide, silicon carbide, silicon nitride, magnesium oxide, aluminum nitride, boron nitride, graphite and mixtures thereof, and the metal powder is selected from among aluminum, copper, silver, gold, nickel, iron, stainless steel and mixtures thereof. Any combination of such powders is also acceptable.

Although the average particle size of component (C) is not particularly limited, the average particle size is preferably up to 50 μm, typically 0.1 to 50 μm, more preferably 0.2 to 30 μm, and most preferably 0.2 to 20 μm. A filler with an average particle size of more than 50 μm may be difficult to disperse in the silicone fluid and when a liquid silicone rubber composition filled with such a filler is allowed to stand, the filler will settle out. The average particle size as used herein can be determined, for example, as the cumulative weight average diameter ($D_{50}$ or median diameter) upon measurement of particle size distribution by laser light diffractometry.

The heat conductive filler is preferably of a round shape approximate to a sphere. The rounder the shape, the filler can be packed to the higher density while minimizing a viscosity buildup. Such spherical heat conductive fillers are commercially available under the trade name of spherical alumina AS series from Showa Denko K.K. and high purity spherical alumina AO series from Admatechs Co., Ltd. A combination of a heat conductive filler powder having a relatively large particle size with a heat conductive filler powder having a relatively small particle size in a proportion complying with the theoretical distribution curve of the closest packing is preferred for improving the packing efficiency and for achieving a low viscosity and high thermal conductivity.

The amount of component (C) compounded is 100 to 3,500 parts by weight, preferably 500 to 3,000 parts by weight, more preferably 500 to 2,500 parts by weight, and most preferably 1,000 to 2,500 parts by weight, per 100 parts by weight of components (A) and (E) combined or components (A), (E) and (F) combined. If the amount of component (C) is below the lower limit of the above-defined range, the resulting silicone rubber becomes less heat conductive. If the amount of component (C) exceeds the upper limit of the above-defined range, it is difficult to compound with the other components and, even if possible, the resulting silicone rubber composition will have too high a viscosity to mold and work.

Component (D) is a platinum catalyst for promoting the cure of the composition. It is selected, for example, from chloroplatinic acid, alcohol solutions of chloroplatinic acid, platinum-olefin complexes, platinum-alkenylsiloxane complexes, and platinum-carbonyl complexes.

The amount of component (D) compounded is a catalytic amount. Typically, component (D) is compounded in such an amount as to provide 0.01 to 1,000 ppm, preferably 0.05 to 500 ppm, more preferably 0.1 to 500 ppm of metallic platinum based on the total weight of components (A), (B), and (E) or components (A), (B), (E) and (F) if present. If the amount of component (D) is below the lower limit of the above-defined range, the resulting silicone rubber composition may be under-cured. Even if the amount of component (D) exceeds the upper limit of the above-defined range, the resulting silicone rubber composition may not be so increased in curing rate.

Component (E) ensures that the silicone rubber composition is effectively handleable and moldable and especially flowable even when it is heavily loaded with the heat conductive filler (C). It is an organopolysiloxane represented by the general formula (I) and having a molecular weight of at least 10,000, preferably 10,000 to 500,000, more preferably 15,000 to 100,000. Note that the molecular weight is measured, for example, as a weight average molecular weight (Mw) by gel permeation chromatography (GPC).

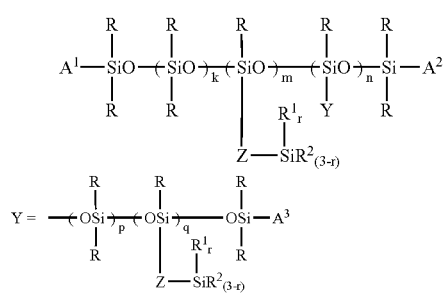

Herein R is each independently a substituted or unsubstituted, monovalent hydrocarbon radical, $R^1$ is a monovalent hydrocarbon radical of 1 to 4 carbon atoms, $R^2$ is an alkoxy, alkenyloxy or acyloxy radical of 1 to 4 carbon atoms, Z is an oxygen atom or a divalent hydrocarbon radical of 2 to 10 carbon atoms, r is 0, 1 or 2, k is an integer of 100 to 1,000, m is an integer of 0 to 20, n is an integer of 0 to 20, p is an integer of 50 to 1,000, q is an integer of 0 to 20, the sum of k+m+n is from 100 to 1,000, each of $A^1$, $A^2$ and $A^3$ is R or —Z—Si$(R^1_r)R^2_{(3-r)}$ wherein $R^1$, $R^2$, r and Z are as defined above, at least one —Z—Si$(R^1_r)R^2_{(3-r)}$ radical being included per molecule. The number of silicon atoms participating in the siloxane (Si—O—Si) structure in the molecule is generally about 100 to about 1,000, preferably about 130 to about 1,000, more preferably about 200 to about 800.

Examples of substituted or unsubstituted, monovalent hydrocarbon radicals represented by R include those of 1 to about 20 carbon atoms, preferably 1 to about 10 carbon atoms, typically saturated hydrocarbon radicals, for example, alkyl radicals such as methyl, ethyl, propyl, isopropyl, butyl, tert-butyl, and hexyl, and cycloalkyl radicals such as cyclohexyl; unsaturated hydrocarbon radicals, for example, aryl radicals such as phenyl, tolyl, xylyl and naphthyl, aralkyl radicals such as benzyl and phenylethyl, and alkenyl radicals such as vinyl, allyl, propenyl, isopropenyl and butenyl; and halo- and cyano-substituted hydrocarbon radicals such as 3,3,3-trifluoropropyl. Of these, methyl, phenyl and vinyl are preferred.

Examples of $R^1$ include alkyl radicals such as methyl, ethyl, propyl, isopropyl, butyl, isobutyl, and tert-butyl. Examples of $R^2$ include methoxy, ethoxy, n-propoxy, isopropoxy, n-butoxy, acetoxy, vinyloxy, allyloxy, propenoxy, isopropenoxy. Examples of Z include an oxygen atom, and divalent hydrocarbon radicals, typically alkylene radicals of 2 to 6 carbon atoms, such as —CH$_2$CH$_2$—, —CH$_2$CH$_2$CH$_2$—, —CH$_2$CH$_2$CH$_2$CH$_2$CH$_2$CH$_2$—, and —CH$_2$CH(CH$_3$)CH$_2$—.

The subscript r is preferably 0 or 1, most preferably 0. Preferably, k is an integer of 200 to 800, m is an integer of 0 to 10, n is an integer of 0 to 10, p is an integer of 100 to 800, q is an integer of 0 to 10, the sum of k+m+n is from 200 to 800. If the sum of k+m+n exceeds 1,000, the composition has an extremely high viscosity.

In a preferred embodiment, component (E) is a diorganopolysiloxane containing a trifunctional hydrolyzable radical at one or both ends and represented by the general formula (II), because it is more effective for reducing the viscosity of the composition while maintaining a smooth flow.

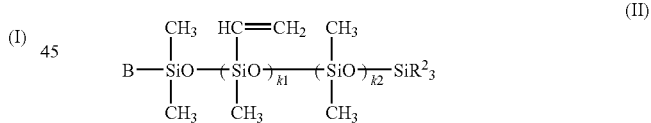

Herein B is methyl, alkenyl, or —O—SiR$^2_3$ wherein $R^2$ is as defined above, $k_1$ is an integer of 0 to 20, $k_2$ is an integer of 130 to 1,000, and the sum of $k_1+k_2$ is from 130 to 1,000, preferably from 200 to 1,000.

Typical examples of the diorganopolysiloxane (E) are given below although component (E) is not limited thereto.

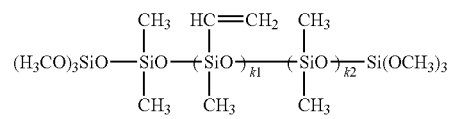

Herein $k_1$ is an integer of 0 to 20, preferably 0 to 10, $k_2$ is an integer of 130 to 1,000, preferably 200 to 800, and the sum of $k_1+k_2$ is from 130 to 1,000, preferably from 200 to 800.

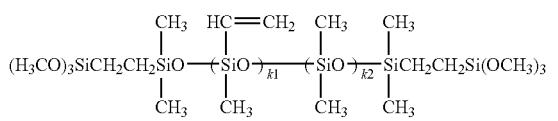

Herein $k_1$ is an integer of 0 to 20, preferably 0 to 10, $k_2$ is an integer of 130 to 1,000, preferably 200 to 800, and the sum of $k_1+k_2$ is from 130 to 1,000, preferably from 200 to 800.

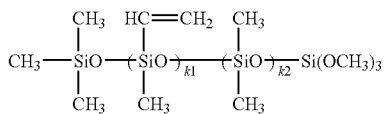

Herein $k_1$ is an integer of 0 to 20, preferably 0 to 10, $k_2$ is an integer of 130 to 1,000, preferably 200 to 800, and the sum of $k_1+k_2$ is from 130 to 1,000, preferably from 200 to 800.

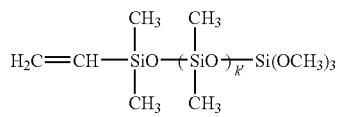

Herein k' is from 140 to 1,000, preferably from 200 to 800.

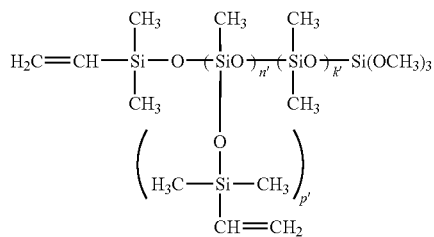

Herein k' is an integer of 99 to 999, preferably 200 to 800, n' is an integer of 1 to 20, preferably 1 to 10, p' is an integer of 50 to 1,000, preferably 100 to 800, and the sum of k'+n' is from 100 to 1,000, preferably from 100 to 800.

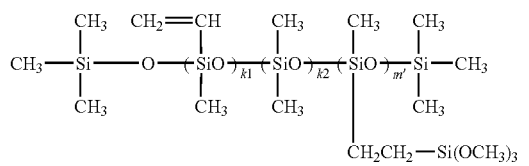

Herein $k_1$ is an integer of 0 to 20, preferably 0 to 10, $k_2$ is an integer of 99 to 999, preferably 200 to 800, m' is an integer of 1 to 20, preferably 1 to 10, and the sum of $k_1+k_2+m'$ is from 100 to 1,000, preferably from 200 to 800.

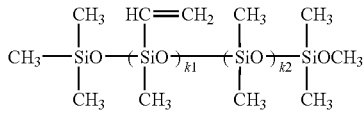

Herein $k_1$ is an integer of 0 to 20, preferably 0 to 10, $k_2$ is an integer of 130 to 1,000, preferably 200 to 800, and the sum of $k_1+k_2$ is from 130 to 1,000, preferably from 200 to 800.

The amount of component (E) added is 98 to 1 part by weight, preferably 70 to 5 parts by weight, and more preferably 50 to 5 parts by weight per 100 parts by weight of components (A) and (E) combined or components (A), (E) and (F) combined. Relative to component (C), the amount of component (E) added is 0.1 to 30 parts by weight, preferably 0.1 to 20 parts by weight, and more preferably 0.1 to 10 parts by weight per 100 parts by weight of component (C). If the amount of component (E) is below the lower limits of the above-defined ranges, the resulting silicone rubber composition becomes less moldable. If the amount of component (E) exceeds the upper limits of the above-defined ranges, no further improvements are expectable and the reduced proportion of component (C) in the composition can invite a drop of thermal conductivity.

Component (F) which is optional is a diorganopolysiloxane. Like component (E), component (F) is effective for facilitating the handling and molding of the silicone rubber composition even when the composition is heavily loaded with the heat conductive filler (C). The combined use of components (E) and (F) is more effective for reducing the viscosity of the composition. Specifically, component (F) is a diorganopolysiloxane having the general formula (III):

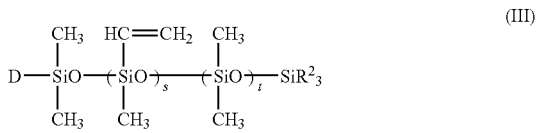

(III)

wherein D is methyl or alkenyl, $R^2$ is as defined above, s is an integer of 0 to 10, t is an integer of 3 to 120, and the sum of s+t is from 5 to 129, preferably 5 to 120.

Typical examples of the diorganopolysiloxane (F) are given below although component (F) is not limited thereto.

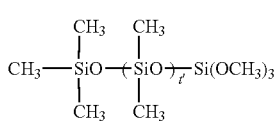

Herein t' is an integer of 5 to 120, preferably 20 to 100.

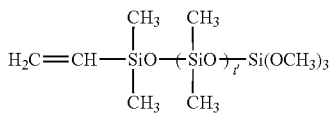

Herein t' is an integer of 5 to 120, preferably 20 to 100.

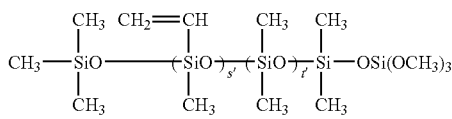

Herein s' is an integer of 0 to 10, preferably 0 to 5, t' is an integer of 3 to 120, preferably 20 to 100, and the sum of s'+t' is 5 to 129, preferably 10 to 100.

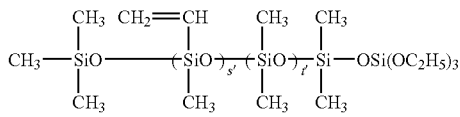

Herein s' is an integer of 0 to 10, preferably 0 to 5, t' is an integer of 3 to 120, preferably 20 to 100, and the sum of s'+t' is 5 to 129, preferably 10 to 100.

The amount of component (F) added is generally up to 30 parts by weight (i.e., 0 to 30 parts by weight), preferably 0.1 to 20 parts by weight, and more preferably 0.1 to 10 parts by weight per 100 parts by weight of component (C). The amount of component (C) is 100 to 3,500 parts by weight, preferably 500 to 3,000 parts by weight, and more preferably 750 to 2,500 parts by weight per 100 parts by weight of components (A), (E) and (F) combined. If the amount of component (F) is below the lower limit of the above-defined range, it may be ineffective for reducing the viscosity of the silicone rubber composition. If the amount of component (F) exceeds the upper limit of the above-defined range, the reduced proportion of component (C) in the composition can invite a drop of thermal conductivity.

The silicone rubber composition of the invention is preferably prepared by previously treating surfaces of component (C) with component (E) and/or (F). The surface treatment of component (C) with component (E) and/or (F) may be carried out, for example, by admixing component (C) with component (E) and/or (F) for treating surfaces of component (C) with component (E) and/or (F) in advance; or by admixing component (A) with (C) and further admixing them with component (E) and/or (F) for treating surfaces of component (C) with component (E) and/or (F) in component (A). At this stage, the admixture is preferably kneaded on a mixer such as a planetary mixer, kneader or Shinagawa mixer while heating at a temperature of at least 80° C. While viscosity reduction and plasticization may be achieved by extending the time of kneading without heating, the heating step is advantageously employed to promote the kneading step, in order to shorten the manufacturing process and reduce the load to the mixer during compounding. In the thus obtained composition, component (C) whose surfaces have been treated with component (E) and/or (F) is present, although the presence of component (E) and/or (F) as liberated from component (C) is allowable in the practice of the invention.

The silicone rubber composition of the invention may contain other optional additives. For example, vinyl-containing organopolysiloxanes such as methylvinylcyclotetrasiloxane, triallyl isocyanurate, acetylene alcohol and siloxane-modified products thereof may be contained for the purposes of adjusting the curing rate and shelf stability of the composition. Also, silicone resins, reinforcing silica, colorants, heat resistance modifiers such as iron oxide and cerium oxide, flame retardants, plasticizers, tackifiers and the like may be contained as long as they do not compromise the benefits of the invention.

It is not critical how to cure the silicone rubber composition of the invention. For example, the composition is molded and then allowed to stand at room temperature. Alternatively, the composition is molded and then heated at 50 to 200° C. The silicone rubber resulting from such curing varies its properties over a wide range from a high-hardness rubber to a low-hardness rubber or gel-like product.

The molded article or silicone rubber preferably has a thermal conductivity of at least 1.5 W/mK, more preferably 1.5 to 10 W/mK.

EXAMPLE

Examples of the invention are given below by way of illustration and not by way of limitation. The viscosity is a measurement at 25° C. by a rotary viscometer. The average particle size is the cumulative weight average diameter ($D_{50}$) upon measurement of particle size distribution by laser light diffractometry.

Examples 1-8 & Comparative Examples 1-3

Heat conductive silicone rubber compositions of Examples and Comparative Examples were prepared by compounding the following components according to the formulation (in parts by weight) shown in Tables 1 and 2.

Specifically, components (A), (C), (E) and (F) were combined, kneaded on a Shinagawa mixer at room temperature for 10 minutes, then heated at 150° C., and kneaded at the temperature for a further one hour. The resulting base was allowed to cool below 40° C., after which it was intimately mixed with component (D) and then with component (G). Finally, component (B) was intimately mixed therewith, yielding a heat conductive silicone rubber composition.

Component (A)
  Component a-1: dimethylpolysiloxane blocked with dimethylvinylsiloxy radicals at both ends, having a viscosity of 30,000 mPa·s at 25° C.
  Component a-2: dimethylpolysiloxane blocked with dimethylvinylsiloxy radicals at both ends, having a viscosity of 600 mPa·s at 25° C.

Component (B)
  Component b: organohydrogenpolysiloxane represented by $(CH_3)_3SiO[SiH(CH_3)O]_8Si(CH_3)_3$, having a viscosity of 5 mPa·s at 25° C. (Si-bonded H content: 0.01451 mol/g)

Component (C)
  Component c-1: spherical aluminum oxide powder having an average particle size of 10 μm (Admafine AO-41R, Admatechs Co., Ltd.)
  Component c-2: spherical aluminum oxide powder having an average particle size of 0.7 μm (Admafine AO-502, Admatechs Co., Ltd.)

Component (D)
  Component d: chloroplatinic acid-vinylsiloxane complex (platinum content 1 wt %)

Component (E)

Component e-1:

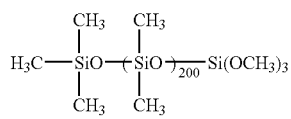

Component e-2:

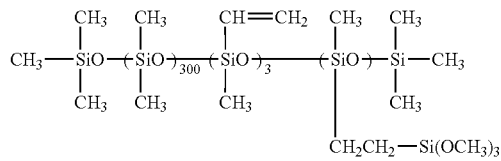

Component e-3:

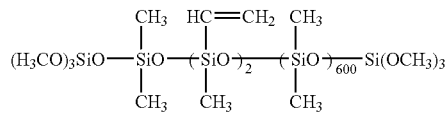

Component e-4:

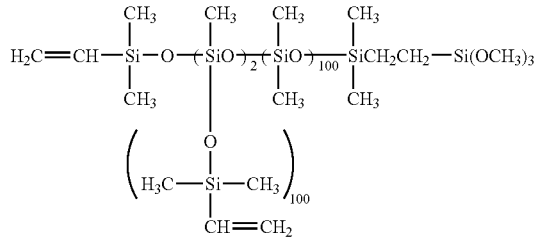

Component (F)

Component f-1:

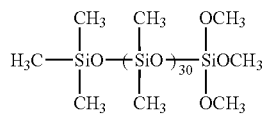

Component f-2:

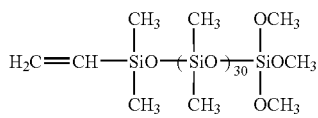

Component (G)

Component g-1: triallyl isocyanurate

Component g-2: ethynyl cyclohexanol/50% toluene solution

These silicone rubber compositions were measured for flow. The compositions were cured by heating at 120° C. for one hour, and the silicone rubber parts were measured for hardness, thermal conductivity, tensile shear strength and shear bond strength. The results are shown in Tables 1 and 2. All measurements are at 25° C.

Flow

A sample, 3 g, was dropped on a glass plate. It was visually observed how the sample flowed thereafter.

Hardness measured according to JIS K6249

Thermal conductivity measured according to the protective heat flow meter method of ASTM E 1530

Tensile Shear Strength measured according to JIS K6249

Al/Al Shear Bond Strength measured according to JIS K6249

As shown in FIG. 1, two aluminum plates 1 of 25 mm wide were joined at end areas (10 mm long) with a silicone rubber composition which was cured thereat to form an adhesive layer 2 having an area of 2.5 cm$^2$ and a thickness of 2 mm, completing an assembly for the shear bond strength test. The shear bond strength of silicone rubber was measured by pulling the aluminum plates at a rate of 50 mm/min in opposite directions as shown in FIG. 1.

TABLE 1

| Composition (pbw) | | Example | | | | | | | |
|---|---|---|---|---|---|---|---|---|---|
| | | 1 | 2 | 3 | 4 | 5 | 6 | 7 | 8 |
| Component (A) | a-1 | 20 | 20 | 20 | 20 | 20 | 0 | 0 | 0 |
| | a-2 | 60 | 60 | 60 | 60 | 60 | 60 | 80 | 70 |
| Component (B) | b | 2.0 | 2.2 | 2.0 | 2.2 | 2.0 | 1.7 | 2.2 | 2.2 |
| Component (C) | c-1 | 800 | 800 | 800 | 800 | 800 | 800 | 800 | 600 |
| | c-2 | 200 | 200 | 200 | 200 | 200 | 200 | 200 | 150 |
| Component (D) | d | 0.2 | 0.2 | 0.2 | 0.2 | 0.2 | 0.2 | 0.2 | 0.2 |
| Component (E) | e-1 | 5 | 0 | 0 | 0 | 10 | 40 | 0 | 0 |
| | e-2 | 0 | 5 | 0 | 0 | 0 | 0 | 0 | 30 |
| | e-3 | 0 | 0 | 5 | 0 | 0 | 0 | 5 | 0 |
| | e-4 | 0 | 0 | 0 | 5 | 0 | 0 | 0 | 0 |
| Component (F) | f-1 | 0 | 0 | 0 | 10 | 10 | 0 | 12 | 0 |
| | f-2 | 15 | 15 | 15 | 15 | 0 | 0 | 3 | 0 |
| Component (G) | g-1 | 1 | 1 | 1 | 1 | 1 | 1 | 1 | 1 |
| | g-2 | 0.3 | 0.3 | 0.3 | 0.3 | 0.3 | 0.3 | 0.3 | 0.3 |
| Test results | | | | | | | | | |
| Flow | | Good | Good | Good | Good | Good | Good | Good | Good |
| Hardness (Durometer type A) | | 93 | 95 | 96 | 95 | 85 | 87 | 92 | 85 |
| Thermal conductivity (W/mK) | | 2.5 | 2.5 | 2.5 | 2.5 | 2.5 | 2.5 | 2.5 | 2.0 |
| Tensile shear strength (MPa) | | 3.4 | 3.9 | 3.0 | 3.2 | 1.8 | 1.5 | 2.9 | 3.4 |

TABLE 1-continued

| Composition | Example | | | | | | | |
|---|---|---|---|---|---|---|---|---|
| (pbw) | 1 | 2 | 3 | 4 | 5 | 6 | 7 | 8 |
| Al/Al shear bond strength (MPa) | 0.9 | 1.0 | 1.1 | 1.1 | 0.6 | 0.5 | 1.1 | 0.9 |

TABLE 2

| Composition | | Comparative Example | | |
|---|---|---|---|---|
| (pbw) | | 1 | 2 | 3 |
| Component (A) | a-1 | 30 | 20 | 20 |
| | a-2 | 70 | 60 | 60 |
| Component (B) | b | 1.7 | 1.7 | 1.7 |
| Component (C) | c-1 | 800 | 800 | 800 |
| | c-2 | 200 | 200 | 200 |
| Component (D) | d | 0.2 | 0.2 | 0.2 |
| Component (E) | e-1 | 0 | 0 | 0 |
| | e-2 | 0 | 0 | 0 |
| | e-3 | 0 | 0 | 0 |
| | e-4 | 0 | 0 | 0 |
| Component (F) | f-1 | 0 | 20 | 10 |
| | f-2 | 0 | 0 | 10 |
| Component (G) | g-1 | 1 | 1 | 1 |
| | g-2 | 0.3 | 0.3 | 0.3 |
| Test results | | | | |
| Flow | | very difficult to mold | Defective | Defective |
| Hardness (Durometer type A) | | | 91 | 97 |
| Thermal conductivity (W/mK) | | | 2.5 | 2.5 |
| Tensile shear strength (MPa) | | | 2.2 | 2.9 |
| Al/Al shear bond strength (MPa) | | | 0.2 | 0.8 |

Japanese Patent Application No. 2004-143977 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A heat conductive silicone rubber composition comprising (A) 2 to 99 parts by weight of an organopolysiloxane containing, on the average, at least 0.1 silicon-bonded alkenyl radical in a molecule and having a viscosity of 50 to 100,000 mPa·s at 25° C., (B) an organopolysiloxane containing, on the average, at least 2 silicon-bonded hydrogen atoms in a molecule and having a viscosity of 1 to 100,000 mPa·s at 25° C., in an amount to give 0.1 to 6.0 moles of silicon-bonded hydrogen atoms per mole of total silicon-bonded alkenyl radicals in entire components, (C) a heat conductive filler in an amount of 100 to 3,500 parts by weight per 100 parts by weight of components (A) and (E) combined, (D) an effective amount of a platinum catalyst, and (E) 98 to 1 part by weight of an organopolysiloxane represented by the following formula and having a molecular weight of at least 10,000, the amount of components (A) and (E) combined being 100 parts by weight:

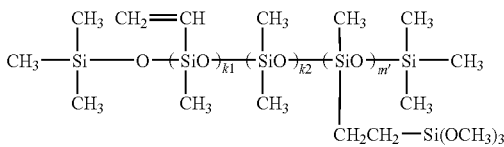

wherein $k_1$ is an integer of 0 to 20, $k_2$ is an integer of 160 to 999, m' is an integer of 1 to 20, and the sum of $k_1+k_2+m'$ is from 200 to 1,000.

2. A heat conductive silicone rubber composition comprising (A) 2 to 99 parts by weight of an organopolysiloxane containing, on the average, at least 0.1 silicon-bonded alkenyl radical in a molecule and having a viscosity of 50 to 100,000 mPa·s at 25° C., (B) an organopolysiloxane containing, on the average, at least 2 silicon-bonded hydrogen atoms in a molecule and having a viscosity of 1 to 100,000 mPa·s at 25° C., in an amount to give 0.1 to 6.0 moles of silicon-bonded hydrogen atoms pa mole of total silicon-bonded alkenyl radicals in entire components, (C) a heat conductive filler in an amount of 100 to 3,500 parts by weight per 100 parts by weight of components (A) and (E) combined, (D) an effective amount of a platinum catalyst, and (E) 98 to 1 part by weight of an organopolysiloxane represented by the general formula (I) and having a molecular weight of at least 10,000, the amount of components (A) and (E) combined being 100 parts by weight,

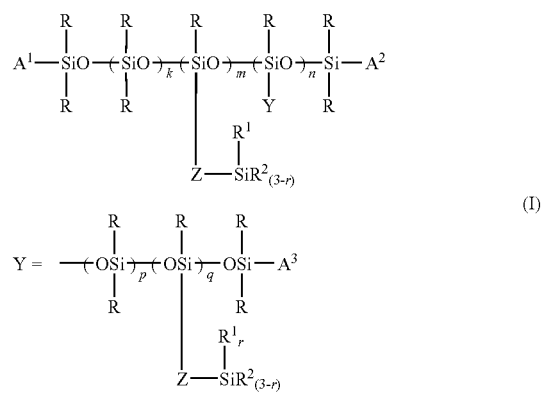

wherein R is each independently a substituted or unsubstituted, monovalent hydrocarbon radical, $R^1$ is a monovalent hydrocarbon radical of 1 to 4 carbon atoms, $R^2$ is an alkoxy, alkenyloxy or acyloxy radical of 1 to 4 carbon atoms, Z is an oxygen atom or a divalent hydrocarbon radical of 2 to 10 carbon atoms, r is 0, 1 or 2, k is an integer of 100 to 1,000, m is an integer of 0 to 20, n is an integer of 1 to 20, p is an integer of 50 to 1,000, q is an integer of 0 to 20, the sum of k+m+n is from 100 to 1,000, each of $A^1$, $A^2$ and $A^3$ is R or $-Z-Si(R^1_r)R^2_{(3-r)}$ wherein $R^1$, $R^2$, r and Z are as defined above, at least one $-Z-Si(R^1_r)R^2_{(3-r)}$ radical being included per molecule.

3. A heat conductive silicone rubber composition comprising (A) 2 to 99 parts by weight of an organopolysiloxane containing, on the average, at least 0.1 silicon-bonded alkenyl radical in a molecule and having a viscosity of 50 to 100,000 mPa·s at 25° C., (B) an organopolysiloxane containing, on the average, at least 2 silicon-bonded hydrogen atoms in a molecule and having a viscosity of 1 to 100,000 mPa·s at 25° C., in an amount to give 0.1 to 6.0 moles of silicon-bonded hydrogen atoms per mole of total silicon-bonded alkenyl radicals in entire components, (C) a heat conductive filler in an amount of 100 to 3,500 parts by weight per 100 parts by weight of components (A) and (E) combined, (D) an effective amount of a platinum catalyst, and (E) 98 to 1 part by weight of an organopolysiloxane represented by the general formula (I) and having a molecular weight of at least 10,000, the amount of components (A) and (E) combined being 100 parts by weight,

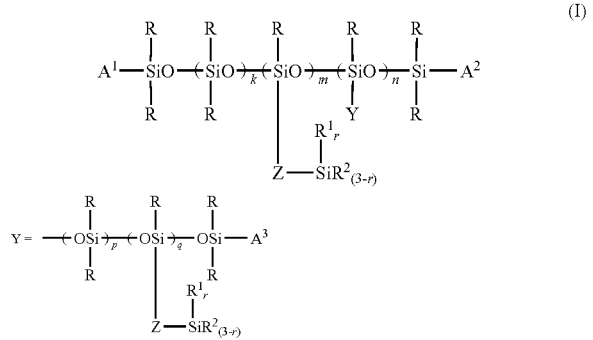

wherein R is each independently a substituted or unsubstituted, monovalent hydrocarbon radical, $R^1$ is a monovalent hydrocarbon radical of 1 to 4 carbon atoms, $R^2$ is an alkoxy, alkenyloxy or acyloxy radical of 1 to 4 carbon atoms, Z is an oxygen atom or a divalent hydrocarbon radical of 2 to 10 carbon atoms, r is 0, 1 or 2, k is an integer of 100 to 1,000, m is an integer of 0 to 20, n is an integer of 0 to 20, p is an integer of 50 to 899, q is an integer of 0 to 20, the sum of k+m+n is from 100 to 1,000, each of $A^1$, $A^2$ is $-Z-Si(R^1_r)R^2_{(3-r)}$ and $A^3$ is R or $-Z-Si(R^1_r)R^2_{(3-r)}$ wherein $R^1$, $R^2$, r and Z are as defined above, and the number of silicon atoms participating in the siloxane (Si—O—Si) structure in the molecule is 130 to 1,000.

4. The heat conductive silicone rubber composition of claim 3, wherein component (E) has a structure of the general formula (II):

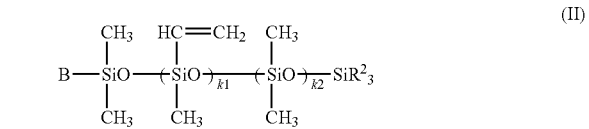

wherein B is $-O-SiR^2_3$ wherein $R^2$ is as defined above, $k_1$ is an integer of 0 to 20, $k_2$ is an integer of 130 to 1,000, and the sum of $k_1+k_2$ is from 130 to 1,000.

5. The heat conductive silicone rubber composition according to claim 1, 2 or 3, further comprising (F) a diorganopolysiloxane having the general formula (III) in an amount of 0.1 to 30 parts by weight per 100 parts by weight of component (C),

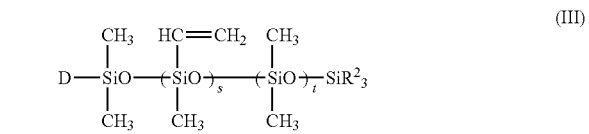

wherein D is methyl or alkenyl, $R^2$ is as defined above, s is an integer of 0 to 10, t is an integer of 3 to 120, and the sum of s+t is from 5 to 129.

6. The heat conductive silicone rubber composition according to claim 1, 2 or 3, wherein component (C) is present in an amount of 100 to 3,500 parts by weight per 100 parts by weight of components (A), (E) and (F) combined.

7. The heat conductive silicone rubber composition according to claim 1, 2 or 3, wherein component (C) is an inorganic powder, a metal powder or a mixture thereof.

8. The heat conductive silicone rubber composition according to claim 1, 2 or 3, wherein the inorganic powder is selected from the group consisting of aluminum oxide, zinc oxide, silicon oxide, silicon carbide, silicon nitride, magnesium oxide, aluminum nitride, boron nitride, graphite and mixtures thereof, and the metal powder is selected from the group consisting of aluminum, copper, silver, gold, nickel, iron, stainless steel and mixtures thereof.

9. A molded article resulting from molding and curing of the heat conductive silicone rubber composition according to claim 1, 2 or 3.

10. The molded article according to claim 1, 2 or 3, having a thermal conductivity of at least 1.5 W/mK.

* * * * *